United States Patent
Han et al.

(10) Patent No.: US 12,116,436 B2
(45) Date of Patent: Oct. 15, 2024

(54) POLYMER DISPERSANT CAPABLE OF HYBRIDIZING NANO-METAL AND NANO-CARBON, PREPARING METHOD THEREFOR, AND METHOD FOR MANUFACTURING HYBRID FILM USING THEREOF

(71) Applicants: PUSAN NATIONAL UNIVERSITY INDUSTRY-UNIVERSITY COOPERATION FOUNDATION, Busan (KR); KONGJU NATIONAL UNIVERSITY INDUSTRY-UNIVERSITY COOPERATION FOUNDATION, Gongju-si (KR); INDUSTRY FOUNDATION OF CHONNAM NATIONAL UNIVERSITY, Gwangju (KR)

(72) Inventors: Jong Hun Han, Goyang-si (KR); Hyun Jong Paik, Busan (KR); Long Hai Piao, Sejong-si (KR); Min Ho Kwon, Daegu (KR); Han Young Kim, Changwon-si (KR)

(73) Assignees: PUSAN NATIONAL UNIVERSITY INDUSTRY-UNIVERSITY COOPERATION FOUNDATION, Busan (KR); KONGJU NATIONAL UNIVERSITY INDUSTRY-UNIVERSITY COOPERATION FOUNDATION, Gongju-si (KR); INDUSTRY FOUNDATION OF CHONNAM NATIONAL UNIVERSITY, Gwangju (KR)

(*) Notice: Subject to any disclaimer, the term of this patent is extended or adjusted under 35 U.S.C. 154(b) by 750 days.

(21) Appl. No.: 17/419,920

(22) PCT Filed: Dec. 30, 2019

(86) PCT No.: PCT/KR2019/018743
§ 371 (c)(1),
(2) Date: Jun. 30, 2021

(87) PCT Pub. No.: WO2020/141835
PCT Pub. Date: Jul. 9, 2020

(65) Prior Publication Data
US 2022/0081503 A1 Mar. 17, 2022

(30) Foreign Application Priority Data
Dec. 31, 2018 (KR) .................. 10-2018-0174170

(51) Int. Cl.
*C08F 220/34* (2006.01)
*C08J 5/18* (2006.01)
(Continued)

(52) U.S. Cl.
CPC .......... *C08F 220/34* (2013.01); *C08J 5/18* (2013.01); *C08K 3/042* (2017.05); *C08K 7/06* (2013.01);
(Continued)

(58) Field of Classification Search
CPC ....................................... C08F 28/06
See application file for complete search history.

(56) References Cited

FOREIGN PATENT DOCUMENTS

| KR | 10-1068940 B1 | 9/2011 |
| KR | 10-1498601 B1 | 3/2015 |

(Continued)

OTHER PUBLICATIONS

Chen et al. "Novel Zwitterionic Copolymers with Dihydrolipoic Acid: Synthesis and Preparation of Nonfouling Nanorods" Macromolecules, 2012, 46, 119-127. (Year: 2012).*
Sieczkowska et al. "Synthesis and Characterization of photolabile aminoterpolymers for covelent attachment onto gold substrates" Designed Monomers and Polymers, 2005, 8:6, 629-644. (Year: 2005).*

(Continued)

*Primary Examiner* — Peter F Godenschwager
(74) *Attorney, Agent, or Firm* — Paratus Law Group, PLLC (57) ABSTRACT

Disclosed are a polymeric dispersant capable of hybridizing nano-metal and nano-carbon, a polymeric dispersant being composed of a monomer capable of undergoing radical polymerization while having a disulfide functional group, 2-(dimethylamino)ethyl methacrylate, and an aromatic monomer having at least one unsaturated group, a method for preparing thereof, and a method of manufacturing a hybrid film using the polymeric dispersant.

15 Claims, 4 Drawing Sheets

(51) Int. Cl.
*C08K 3/04* (2006.01)
*C08K 7/06* (2006.01)
*C09K 5/14* (2006.01)
*C09K 23/16* (2022.01)
*H01B 1/22* (2006.01)
*H01B 1/24* (2006.01)

(52) U.S. Cl.
CPC ............... *C09K 5/14* (2013.01); *C09K 23/16* (2022.01); *H01B 1/22* (2013.01); *H01B 1/24* (2013.01); *C08F 2800/10* (2013.01); *C08F 2800/20* (2013.01); *C08F 2810/40* (2013.01); *C08J 2333/14* (2013.01); *C08K 2201/001* (2013.01); *C08K 2201/011* (2013.01)

(56) References Cited

FOREIGN PATENT DOCUMENTS

KR 10-1735453 B1 5/2017
KR 10-2018-0108223 A 10/2018

OTHER PUBLICATIONS

International Search Report for PCT/KR2019/018743 mailed Apr. 14, 2020 from Korean Intellectual Property Office.
Chunhua Luo et al., "Light-Tunable Thermosensitivity of Polymer-Coated Gold Nanoparticles Achieved by Light-Controlled Molecular Recognition", Macromolecular Chemistry and Physics, 2011, pp. 1360-1365, vol. 212, No. 13.

* cited by examiner

POLYMER DISPERSANT CAPABLE OF HYBRIDIZING NANO-METAL AND NANO-CARBON, PREPARING METHOD THEREFOR, AND METHOD FOR MANUFACTURING HYBRID FILM USING THEREOF

CROSS-REFERENCE TO PRIOR APPLICATIONS

This application is a National Stage Patent Application of PCT International Patent Application No. PCT/KR2019/018743 (filed on Dec. 30, 2019) under 35 U.S.C. § 371, which claims priority to Korean Patent Application No. 10-2018-0174170 (filed on Dec. 31, 2018), which are all hereby incorporated by reference in their entirety.

BACKGROUND

The present invention relates to a polymeric dispersant capable of hybridizing nano-metal and nano-carbon together, a method for preparing thereof, and a method of manufacturing a hybrid film using the same, and more particularly, to a polymeric dispersant capable of hybridizing nano-metal and nano-carbon together, the polymeric dispersant being composed of a monomer capable of undergoing radical polymerization while having a disulfide functional group, 2-(dimethylamino)ethyl methacrylate, and an aromatic monomer having at least one unsaturated group, a method for preparing thereof, and a method of manufacturing a hybrid film using the polymeric dispersant.

Nano-metal materials have good flexibility and better thermal and electrical conductivity than nano-carbon materials, and thus have attracted a lot of attention as materials for transparent electrodes or displays. However, the nano-metal materials have very low oxidative, chemical, and thermal stability, which limits their application.

In order to solve the above-described problem and increase the stability of the nano-metal material, the nano-metal material is subjected to a plasma process, or single molecule or a polymer is attached to the nano-metal material, or the nano-metal material is produced as a hybrid with a nano-carbon material. In particular, when the nano-metal material is produced as a hybrid with the nano-carbon material, not only the stability but also the mechanical strength thereof may be increased. Thus, many studies on hybrid materials of nano-metal and nano-carbon have been conducted.

In fact, many studies have been conducted on a transparent conductive film which is produced by coating a nano-metal metal material-coated film with a nano-carbon material, various hybrid production methods such as a method of producing a printable material or a conductive film by attaching a nano-metal material and a nano-carbon material to each other by benzyl mercaptan or cysteamine, and the applications of these hybrids.

However, studies on producing a hybrid material using a polymeric dispersant have hardly been conducted. In general, when a hybrid film is to be produced, there are disadvantages in that a separate substrate is usually required, and various devices and processes for producing the film are required. In addition, the nano-carbon material has a problem in that the efficiency with which the nano-carbon material is dispersed in a conventional dispersant is significantly low.

Therefore, in order to overcome the above-described problems, the present inventors have recognized that there is an urgent need for the development of a polymeric dispersant capable of hybridizing nano-metal and nano-carbon together, a method for producing the same, and a hybrid film produced using the same, thereby completing the present invention.

SUMMARY

An object of the present invention is to provide a polymeric dispersant capable of hybridizing nano-metal and nano-carbon together, the polymeric dispersant being composed of a monomer capable of undergoing radical polymerization while having a disulfide functional group, 2-(dimethylamino)ethyl methacrylate, and an aromatic monomer having at least one unsaturated group.

Another object of the present invention is to provide a method for producing a polymeric dispersant capable of hybridizing nano-metal and nano-carbon together, the polymeric dispersant being composed of a monomer capable of undergoing radical polymerization while having a disulfide functional group, 2-(dimethylamino)ethyl methacrylate, and an aromatic monomer having at least one unsaturated group.

Still another object of the present invention is to provide a method of producing a hybrid film, which has excellent thermal conductivity and electrical conductivity, is flexible, and has low water permeability, by using the polymeric dispersant capable of hybridizing nano-metal and nano-carbon together.

To achieve the above objects, the present invention provides a polymeric dispersant capable of hybridizing nano-metal and nano-carbon together, a method for producing the same, and a method of producing a hybrid film using the same.

Hereinafter, the present invention will be described in more detail.

The present invention provides a polymeric dispersant represented by the following Formula 1, which is capable of hybridizing nano-metal and nano-carbon together:

[Formula 1]

In the present invention, 1, m or n in the polymeric dispersant represented by Formula 1 is an integer ranging from 1 to 500.

In the present invention, the polymeric dispersant represented by Formula 1 may have a molecular weight of $1\times10^4$ to $5\times10^4$ g/mol.

In the present invention, the metal in the nano-metal may be at least one selected from the group consisting of silver (Ag), copper (Cu), gold (Au), chromium (Cr), aluminum (Al), tungsten (W), zinc (Zn), nickel (Ni), iron (Fe), platinum (Pt), and palladium (Pd).

In the present invention, the nano-carbon may be a material that exhibits excellent electrical properties while exhibiting ultra-lightweight or high-strength properties. More specifically, the nano-carbon may be carbon quantum dots, fullerene, carbon nano-ribbons, carbon nano-tubes, or graphene. More preferably, the nano-carbon may be fullerene, carbon nanotubes, or graphene.

The present invention also provides a method for preparing the polymeric dispersant, the method comprising steps of:

(A1) synthesizing a monomer represented by the following Formula 2 using lipoic acid, which has a disulfide functional group, and 2-hydroxyethyl methacrylate; and (A2) preparing a polymeric dispersant represented by the following Formula 1 by mixing the monomer represented by the following Formula 2, a 2-(dimethylamino)ethyl methacrylate represented by the following Formula 3, and an aromatic monomer having at least one unsaturated group:

[Formula 2]

[Formula 3]

In the present disclosure, the aromatic monomer having at least one unsaturated group may be at least one selected from the group consisting of

[Formula 1]

and

[Formula 1]

In the present invention, step (A1) of preparing the monomer represented by Formula 2 may comprise steps of:

(A1a) dissolving a mixture of lipoic acid and 2-hydroxyethyl methacrylate in a solvent;

(A1b) adding dicyclohexylcarbodiimide (DCC) to the mixture, followed by stirring for 12 to 36 hours; and (A1c) obtaining the monomer represented by Formula 2 by removing impurities through chromatography after the stirring.

In the present invention, step (A1a) may further comprise cooling the mixture to a temperature ranging from −5 to 5° C., after dissolving the mixture.

In the present invention, step (A2) may comprise steps of:

(A2a) preparing a mixture by dissolving, in a solvent, the monomer represented by Formula 2, the 2-(dimethylamino) ethyl methacrylate represented by Formula 3, and the aromatic monomer having at least one unsaturated group;

(A2b) stirring the mixture at a temperature ranging from 80 to 100° C.; and (A2c) preparing the polymeric dispersant represented by Formula 1 by removing impurities by centrifugation after completion of the stirring.

In the present invention, the solvent may be at least one selected from the group consisting of a lower alcohol having 1 to 4 carbon atoms, anisole, hexane, ethyl acetate (EA), methyl iodide (iodomethane), azo-bisisobutyronitrile, dichloromethane (DCM), dimethylformamide (DMF), dicyclohexylcarbodiimide (DCC), diethyl ether, chloroform, and acetone.

In the present invention, the method may further comprise step (A3) of quaternizing the polymeric dispersant represented by Formula 1.

In the present invention, step (A3) may comprise steps of:

(A3a) dissolving the polymeric dispersant represented by Formula 1 in a solvent, followed by stirring for 6 to 36 hours; and (A3b) preparing a quaternized polymeric dispersant by removing impurities by centrifugation and drying, after completion of the stirring.

The present invention also provides a method for preparing a hybrid film comprising nano-metal and nano-carbon, the method comprising steps of:

(B1) dispersing nano-carbon in deionized water to obtain a solution;

(B2) dissolving a polymeric dispersant represented by the following Formula 1 in the solution, followed by mixing with the nano-carbon to obtain a mixture;

(B3) manufacturing a hybrid film by adding a nano-metal solution to the mixture:

In the present invention, the nano-carbon may be reduced nano-carbon oxide.

In the present invention, step (B2) may comprise steps of:

(B2a) sonicating the solution prepared in step (B1); and (B2b) adding hydrazine monohydrate to the sonicated solution, followed by stirring for 3 to 10 hours.

In the present invention, the stirring may be performed at 50 to 80° C.

All the matters mentioned in the polymeric dispersant of the present invention, the method for producing the same, and the hybrid film produced are applied in the same manner, unless they are contradictory to one another.

According to the polymeric dispersant of the present invention and the method for preparing thereof, the polymeric dispersant is composed of a monomer capable of undergoing radical polymerization while having a disulfide functional group, 2-(dimethylamino)ethyl methacrylate (DMAEMA), and an aromatic monomer having at least one unsaturated group, and thus is capable of simultaneously dispersing nano-metal and nano-carbon. In addition, the polymeric dispersant may be prepared in a normal production environment, and thus may be easily commercialized.

In addition, the hybrid film manufactured using the polymeric dispersant of the present invention has excellent thermal conductivity and electrical conductivity by simultaneously exhibiting the properties of nano-metal and nano-carbon material, is flexible, and has low water permeability.

DETAILED DESCRIPTION

The present invention provides a polymeric dispersant capable of hybridizing nano-metal and nano-carbon together, a method for producing the same, and a method of producing a hybrid film using the same.

Hereinafter, the present specification will be described in more detail.

Polymeric Dispersant

The present invention provides a polymeric dispersant represented by the following Formula 1, which is capable of hybridizing nano-metal and nano-carbon together:

[Formula 1]

In the present invention, 1, m or n in the polymeric dispersant represented by Formula 1 is an integer ranging from 1 to 500.

In the present invention, the polymeric dispersant represented by Formula 1 may have a molecular weight of $1 \times 10^4$ to $5 \times 10^4$ g/mol.

In the present invention, the metal in the nano-metal may be at least one selected from the group consisting of silver (Ag), copper (Cu), gold (Au), chromium (Cr), aluminum (Al), tungsten (W), zinc (Zn), nickel (Ni), iron (Fe), platinum (Pt), and palladium (Pd).

In the present invention, the nano-carbon may be a material that exhibits excellent electrical properties while exhibiting ultra-lightweight or high-strength properties. More specifically, the nano-carbon may be carbon quantum dots, fullerene, carbon nano-ribbons, carbon nano-tubes, or graphene. More preferably, the nano-carbon may be fullerene, carbon nanotubes, or graphene.

Method for Preparing Polymeric Dispersant

The present invention provides a method for preparing a polymeric dispersant capable of hybridizing nano-metal and nano-carbon together, the method comprising steps of:

(A1) synthesizing a monomer represented by the following Formula 2 using lipoic acid, which has a disulfide functional group, and 2-hydroxyethyl methacrylate; and

(A2) preparing a polymeric dispersant represented by the following Formula 1 by mixing the monomer represented by the following Formula 2, a 2-(dimethylamino)ethyl methacrylate represented by the following Formula 3, and an aromatic monomer having at least one unsaturated group:

[Formula 1]

[Formula 2]

[Formula 3]

In the present invention, the aromatic monomer having at least one unsaturated group may be at least one selected from the group consisting of In the present invention, step (A1) of preparing the monomer represented by Formula 2 may comprise steps of:

(A1a) dissolving a mixture of lipoic acid and 2-hydroxyethyl methacrylate in a solvent;

(A1b) adding dicyclohexylcarbodiimide (DCC) to the mixture, followed by stirring for 12 to 36 hours; and (A1c) preparing the monomer represented by Formula 2 by removing impurities through chromatography after the stirring.

In the present invention, since the lipoic acid has a disulfide functional group, it may exhibit the effect of easily bonding to the nano-metal due to the thiol property of the disulfide.

In the present invention, step (A1a) is a step of dissolving the mixture of lipoic acid and 2-hydroxyethyl methacrylate in a solvent.

In the present invention, in step (A1a), the mixture may be dissolved after removing water from the solvent. More specifically, water in the solvent may be removed using a metal salt. Preferably, water in the solvent may be removed using calcium chloride. As water in the solvent is removed, side reactions that may occur due to water in the solvent may be eliminated.

In the present invention, the solvent that is used in step (A1a) may be at least one selected from the group consisting of a lower alcohol having 1 to 4 carbon atoms, anisole, hexane, ethyl acetate (EA), methyl iodide (iodomethane), azo-bisisobutyronitrile, dichloromethane (DCM), dimethylformamide (DMF), dicyclohexylcarbodiimide (DCC), diethyl ether, chloroform, and acetone. Preferably, the solvent may be at least one selected from the group consisting of dichloromethane, dicyclohexylcarbodiimide, dimethylformamide and chloroform. More preferably, the solvent may be at least one selected from the group consisting of dichloromethane and dimethylformamide.

In the present invention, after step (A1a) is performed and the solvent is placed in a flask, the inside of the flask may be substituted with nitrogen.

In the present invention, after the mixture is dissolved in step (A1a) and substituted with nitrogen, the mixture may be cooled to a temperature ranging from −5 to 5° C., preferably a temperature ranging from −2 to 2° C.

In the present invention, the cooling may be performed using an ice bath or a cryostat, but is not limited thereto and any method may be used as long as it is a method capable of maintaining a constant cooling temperature.

In the present invention, step (A1b) may be a step of (A1b) adding dicyclohexylcarbodiimide to the mixture, followed by stirring for 12 to 36 hours, and the stirring may be performed at ambient temperature or room temperature.

In the present invention, step (A1c) is a step of preparing the monomer represented by Formula 2 by removing impurities through chromatography after the stirring.

More specifically, after stirring in step (A1b), the precipitate in the mixture may be filtered using filter paper to obtain a liquid product. After evaporating the solvent of the liquid product, impurities may be removed through chromatography to obtain the monomer represented by Formula 2.

In the present invention, the chromatography may be silica gel column chromatography.

In the present invention, a developing solvent that is used as a mobile phase for the chromatography may be methanol, ethanol, hexane, acetone, chloroform, dichloromethane, or a mixture thereof. Preferably, the developing solvent may be methanol, chloroform, dichloromethane, or a mixture thereof.

In the present invention, the method may further comprise a step of drying the monomer represented by Formula 2 from which impurities have been removed through chromatography. More specifically, the drying may be performed for 3 to 24 hours, more preferably 6 hours and 18 hours. In addition, the drying may be performed at 15 to 50° C., more preferably 25 to 35° C.

In the present invention, step (A2) of preparing the polymeric dispersant represented by Formula 1 may comprise steps of:

(A2a) preparing a mixture by dissolving, in a solvent, the monomer represented by Formula 2, the 2-(dimethylamino) ethyl methacrylate represented by Formula 3, and the aromatic monomer having at least one unsaturated group;

(A2b) stirring the mixture at a temperature ranging from 80 to 100° C.; and (A2c) preparing the polymeric dispersant represented by Formula 1 by removing impurities by centrifugation after completion of the stirring.

More specifically, step (A2a) is a step of preparing the mixture by dissolving, in a solvent, the monomer represented by Formula 2, the 2-(dimethylamino) ethyl methacrylate represented by Formula 3, and the aromatic monomer having at least one unsaturated group.

In the present invention, the solvent may be at least one selected from the group consisting of a lower alcohol having 1 to 4 carbon atoms, anisole, hexane, ethyl acetate, methyl iodide, dichloromethane, dimethylformamide, dicyclohexylcarbodiimide, diethyl ether, chloroform, and acetone. Preferably, the solvent may be at least one selected from the group consisting of anisole, hexane, and ethyl acetate. More preferably, the solvent may be at least one selected from the group consisting of anisole and hexane.

In the present invention, after step (A2a) is performed and the solvent is placed in a flask, the inside of the flask may be substituted with nitrogen.

In the present invention, step (A2b) is a step of stirring the mixture at a temperature ranging from 80 to 100° C. More specifically, the stirring may be performed in the temperature range of 80 to 100° C. for 1 to 5 hours.

In the present invention, step (A2c) is a step of preparing the polymeric dispersant represented by Formula 1 by removing impurities by centrifugation, after performing step (A2b).

In the present invention, step (A2c) may comprise a step of forming a precipitate using a solvent, before performing centrifugation. More specifically, the solvent that is used to form the precipitate may be at least one solvent selected from the group consisting of dichloromethane, dimethylformamide, diethyl ether, chloroform, and hexane.

In the present invention, after the formation of the precipitate, the liquid product may be separated from the precipitate by centrifugation.

In the present invention, the centrifugation may be performed at a speed of 1,500 to 5,000 ppm, more preferably 2,500 to 4,500 ppm. In addition, the centrifugation may be performed for 1 to 30 minutes.

In the present invention, the method may further comprise a step of drying the solution, after the centrifugation. The drying may be performed at room temperature or by vacuum drying, but is not limited thereto.

In the present invention, the method may further comprise step (A3) of quaternizing the polymeric dispersant represented by Formula 1, after performing step (A2).

In the present invention, step (A3) may comprise steps of:

(A3a) dissolving the polymeric dispersant represented by Formula 1 in a solvent, followed by stirring for 6 to 36 hours; and (A3b) preparing a quaternized polymeric dispersant by removing impurities by centrifugation and drying, after completion of the stirring.

In the present invention, in step (A3a), the polymeric dispersant represented by Formula 1 may be dissolved in a solvent. The solvent may be at least one selected from the group consisting of a lower alcohol having 1 to 4 carbon atoms, anisole, hexane, ethyl acetate, methyl iodide, dichloromethane, dimethylformamide, dicyclohexylcarbodiimide, diethyl ether, chloroform, and acetone. Preferably, the solvent may be at least one selected from the group consisting of dichloromethane and dimethylformamide.

In the present invention, step (A3b) may comprise preparing a quaternized polymeric dispersant by removing impurities by centrifugation and drying, after performing step (A3a).

More specifically, after performing step (A3b) and before performing centrifugation, a step of forming a precipitate using a solvent may be performed. More specifically, the solvent that is used to form a precipitate may be at least one selected from the group consisting of dichloromethane, dimethylformamide, diethyl ether, chloroform, and hexane.

In the present invention, after the formation of the precipitate, the liquid product may be separated from the precipitate by centrifugation.

In the present invention, the centrifugation may be performed at a speed of 1,500 to 5,000 ppm, more preferably 2,500 to 4,500 ppm. In addition, the centrifugation may be performed for 1 to 30 minutes.

In the present invention, the method may further comprise a step of drying the solution, after the centrifugation. The drying may be performed at 20 to 50° C. In addition, the drying may be performed for 6 to 24 hours, but is not limited thereto.

Method of Manufacturing Hybrid Film Using Polymeric Dispersant

The present invention provides a method of manufacturing a hybrid film comprising nano-metal and nano-carbon, and a hybrid film manufactured by the method. The method comprises steps of:

(B1) dispersing nano-carbon in deionized water to obtain a solution;

(B2) dissolving a polymeric dispersant represented by the following Formula 1 in the solution, followed by mixing with the nano-carbon to obtain a mixture;

(B3) manufacturing a hybrid film by adding a nano-metal solution to the mixture:

[Formula 1]

In the present invention, the nano-carbon may be reduced nano-carbon oxide.

In the present invention, the metal in the nano-metal may be at least one selected from the group consisting of silver (Ag), copper (Cu), gold (Au), chromium (Cr), aluminum (Al), tungsten (W), zinc (Zn), nickel (Ni), iron (Fe), platinum (Pt), and palladium (Pd).

In the present invention, the nano-carbon may be a material that exhibits excellent electrical properties while exhibiting ultra-lightweight or high-strength properties. More specifically, the nano-carbon may be carbon quantum dots, fullerene, carbon nano-ribbons, carbon nano-tubes, or graphene. More preferably, the nano-carbon may be fullerene, carbon nanotubes, or graphene.

In the present invention, step (B2) may comprise steps of:

(B2a) sonicating the solution prepared in step (B1); and (B2b) adding hydrazine monohydrate to the sonicated solution, followed by stirring for 3 to 10 hours.

In the present invention, the stirring in step (B2b) may be performed at 50 to 80° C.

The advantages and features of the present invention, and the way of attaining them, will become apparent with reference to the examples described below. However, the present invention is not limited to the embodiments disclosed below and may be embodied in a variety of different forms. Rather, these examples are provided so that this disclosure will be thorough and complete, and will fully convey the scope of the present invention to those skilled in the art. The scope of the present invention will be defined only by the appended claims.

The reagents and solvents mentioned below are purchased from Sigma Aldrich Korea, Daejung Chemicals Co., Ltd, and Sejin CI, unless otherwise specified. $^1$H NMR was measured by a 500-MHz Agilent Superconducting Fourier-transform nuclear magnetic resonance spectrometer with chloroform-D. As scanning electron microscope (SEM) images, field emission scanning electron micrographs (FE-SEM, 20 kV) were acquired with a Carl Zeiss Supra 25 FE-SEM.

Example 1. Synthesis of Polymeric Dispersant Represented by Formula 1

1.1 Synthesis of Monomer Represented by Formula 2

2-hydroxymethyl methacrylic acid    Lipoic acid    Formula 2

Calcium chloride was added to dichloromethane to remove water. In the dichloromethane from which water was removed, 0.71 g (5.8 mmol) of 2-hydroxyethyl methacrylate, 1.0 g (4.9 mmol) of lipoic acid and 0.12 g (0.97 mmol) of 4-(dimethylamino)pyridine were dissolved. The solution was placed in a Schlenk flask which was then substituted with nitrogen. Then, the nitrogen-substituted flask was placed in an ice bath and maintained at 0° C., and a solution of N,N'-dicyclohexylcarbodiimide dissolved in dichloromethane was added dropwise into the Schlenk flask for minutes. The mixture was stirred for 30 minutes, and then further stirred at room temperature for 24 hours. At this time, the formed precipitate was filtered out through a nylon filter, and the liquid product was obtained. The solvent was evaporated from the liquid product, and impurities were removed from the product under the following column chromatography conditions. The resulting material was dried at 30° C. for 12 hours, thus synthesizing the monomer represented by Formula 2.

[Column Chromatography Conditions]
  Column: silica gel column
  Mobile phase: chloroform:methanol mixed solvent 9:1 (v/v)

1.2 Synthesis of Polymeric Dispersant Represented by Formula 1

0.02 mg (0.061 mmol) of the monomer represented by Formula 2, 9.74 mL (58 mmol) of the 2-(dimethylamino) ethyl methacrylate represented by Formula 3, and 0.34 mL (3.0 mmol) of styrene as an aromatic monomer having at least one unsaturated group were dissolved in 14 mL of anisole. The solution was placed in a Schlenk flask which was then substituted with nitrogen for 30 minutes. Then, a solution of 0.005 g (0.030 mmol) of azobisisobutyronitrile dissolved in 1 mL of anisole was substituted with nitrogen for 30 minutes and added to the Schlenk flask. The content in the flask was stirred at 90° C. for 3 hours. Then, the reaction product was precipitated with hexane and centrifuged at 4,000 rpm for 10 minutes to remove impurities. Finally, the remaining material was dried at 30° C. for 2 hours, thus synthesizing the polymeric dispersant represented by Formula 1.

1.3 Quaternized Compound of Formula 1

Formula 1

Quaternized compound of Formula 1

Quaternization was performed in order to increase the water solubility of the polymeric dispersant represented by Formula 1.

More specifically, 1.0 g (0.038 mmol) of the polymeric dispersant represented by Formula 1 was dissolved in 1.0 mL of dimethylformamide, and 0.34 mL (5.5 mmol) of iodomethane was added dropwise thereto. Then, the solution was stirred at room temperature for 24 hours, precipitated with diethyl ether, and then centrifuged at a speed of 4,000 rpm for 10 minutes to remove impurities, and dried under vacuum at 30° C. for 12 hours, thus producing a quaternized compound represented by Formula 1.

Example 2. Manufacture of Hybrid Film

Graphene oxide

Quaternized Formula 1

Silver nano-wire

-continued

Hybrid film 1.00 mg (10 mg/mL) of nano-carbon (graphene oxide) was dispersed in deionized water, and 10.0 mg of the polymeric dispersant represented by Formula 1 (the quaternized polymeric dispersant of Formula 1), prepared in Example 1, was dissolved in the solution (deionized water in which nano-carbon was dispersed) and sonicated for 5 minutes, and 0.1 mL of hydrazine monohydrate was added thereto, followed by stirring at 70° C. for 7 hours. Then, 2 mL of a nano-metal (silver nanowire) solution (silver nanowire solution: 5 mg/mL) was prepared in the form of a film using a vacuum filter, and then added to 4 mL (1 mg/mL) of the solution, thus producing a free-standing hybrid film. Finally, the free-standing hybrid film was immersed in acetone for 10 minutes, and then dried at room temperature, thus producing a hybrid film.

Experimental Example 1. Examination of Water Dispersion Efficiency of Polymeric Dispersant An experiment was performed to examine the water dispersion efficiency of the polymeric dispersant of the present invention. More specifically, each of (a) a conventional polymeric dispersant and (b) the polymeric dispersant (quaternized polymeric dispersant) of Formula 1 prepared in Example 1 was mixed with graphene oxide in water and reduced with hydrazine monohydrate at 70° C., and the results are shown in FIG. 3.

Figure 1:
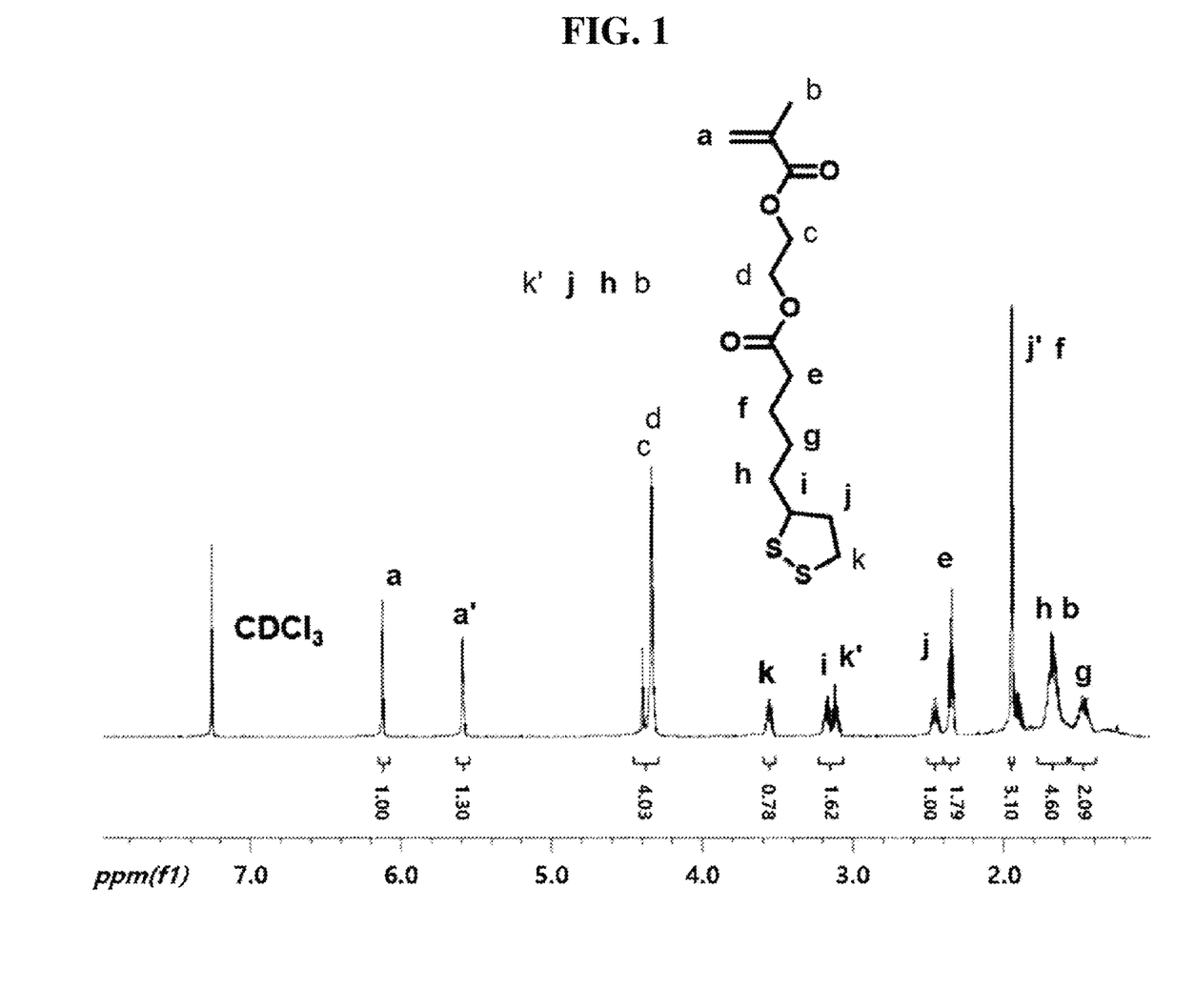
FIG. 1 shows NMR data of a monomer represented by Formula 2 according to the present invention.
Figure 2:
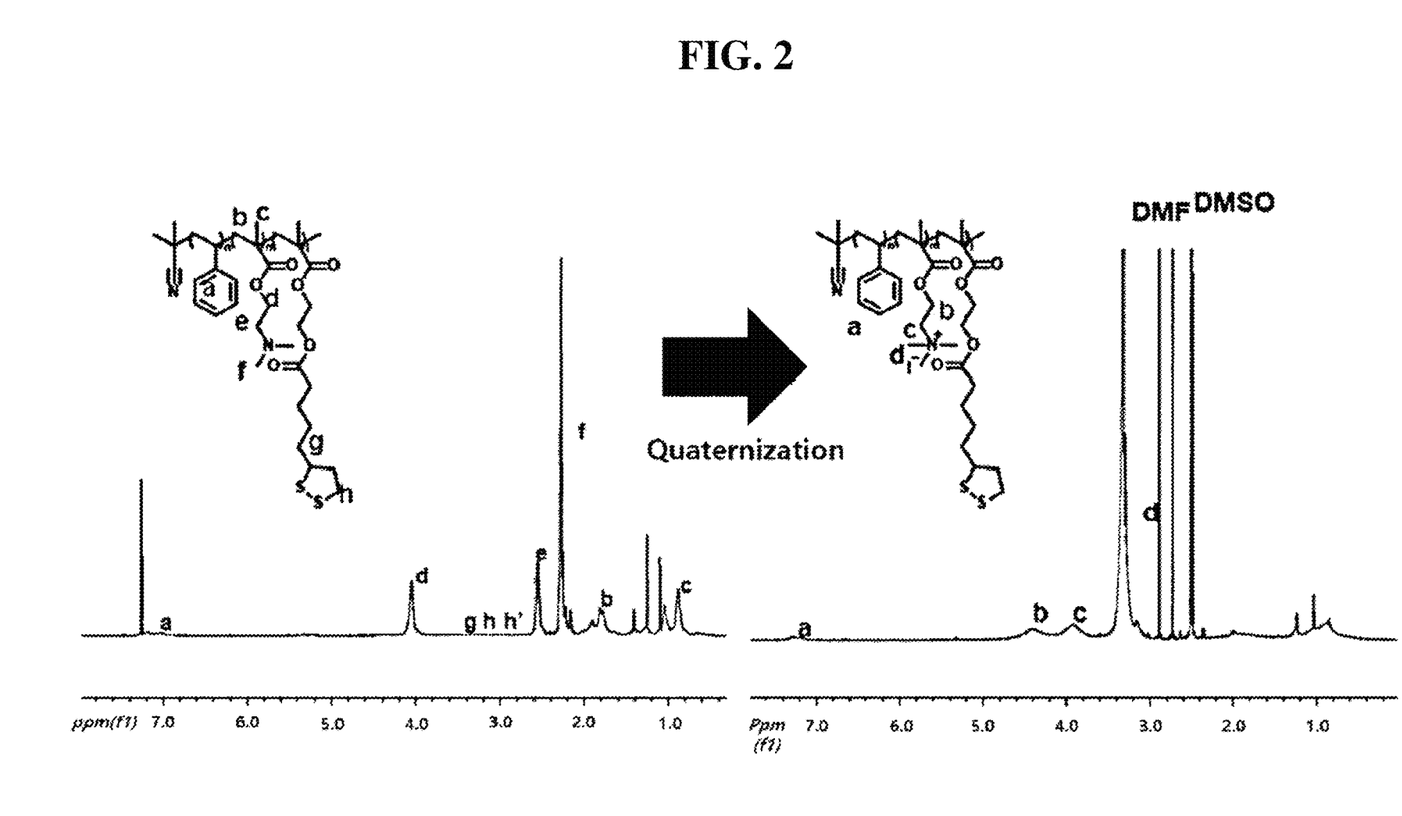
FIG. 2 shows NMR data of a quaternized polymeric polymer represented by Formula 1 according to the present invention.
Figure 3:
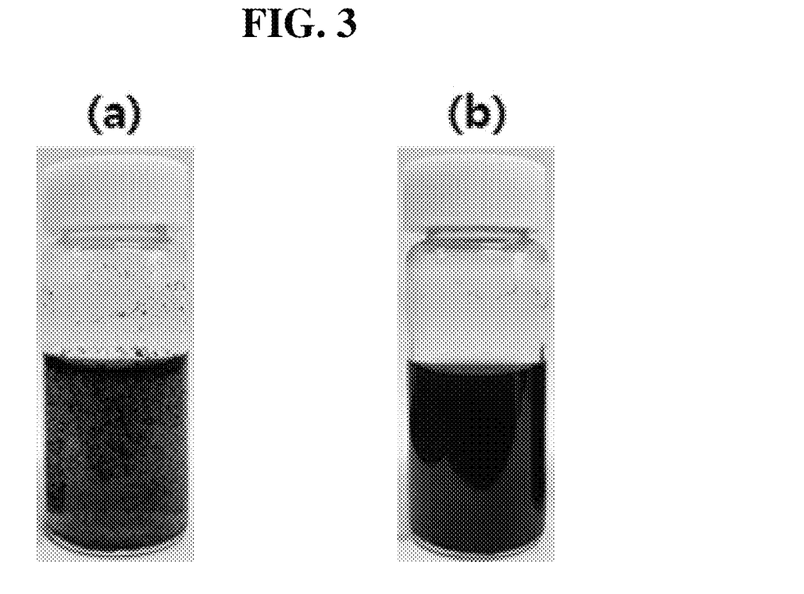
FIG. 3(A) shows a photograph obtained after nano-carbon oxide (graphene) was dispersed in water using a conventional polymeric dispersant and reduced.
FIG. 3(B) shows a photograph obtained after nano-carbon oxide (graphene) was dispersed in water using a polymeric dispersant of the present invention and reduced.

Referring to FIG. 3, it could be confirmed that the polymeric dispersant (quaternized polymeric dispersant) of Formula 1 prepared in Example 1 exhibited remarkably excellent dispersibility compared to the conventional polymeric dispersant in the graphene oxide solution.

Experimental Example 2. Examination of Stability

Figure 4:
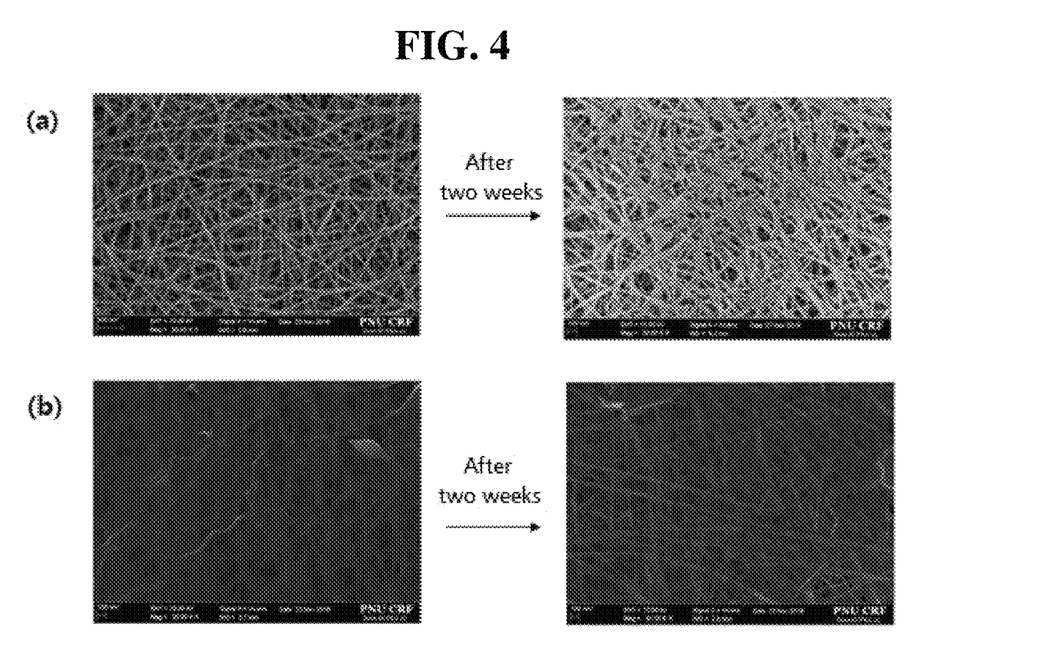
FIG. 4(A) shows SEM images of a conventional nano-metal (silver nano-wire) film.
FIG. 4(B) shows SEM images of a hybrid film of the present invention.

An experiment was performed to examine the stability of the hybrid film of the present invention, and the results are shown in FIG. 4.

Referring to FIG. 4, it could be confirmed that, when the conventional silver nanowire film (FIG. 4(A)) was allowed to stand in the air for 2 weeks, the silver nanowire film was broken at a number of points. On the other hand, it could be confirmed that, in the case of the hybrid film of the present invention (FIG. 4(B)), the nano-metal (silver nanowire) coated with the nano-carbon (graphene) was not broken at all due to the low oxygen and water permeability of the nano-carbon (graphene).

Experimental Example 3. Examination of Sheet Resistance

Figure 5:
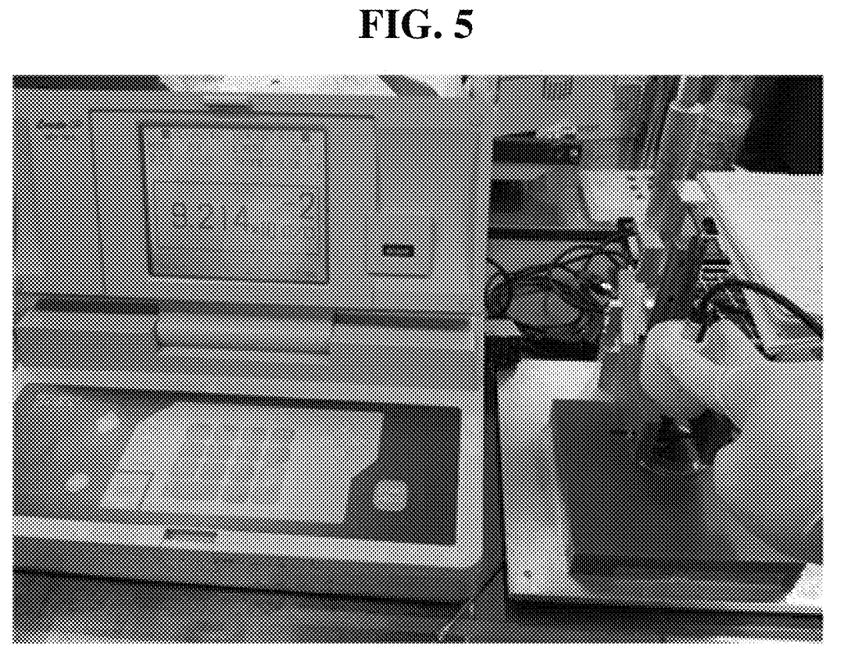
FIG. 5 shows the result of examining the sheet resistance of the hybrid film of the present invention.

In order to examine the sheet resistance of the hybrid film of the present invention, a sheet resistance experiment for the hybrid film prepared in Example 2 of the present invention was conducted by loading the hybrid film on a 4-point probe and then the hybrid film into contact with an electrode, and the results are shown in FIG. 5.

Referring to FIG. 5, it could be confirmed using the 4-point probe that the hybrid film of the present invention had a very low sheet resistance of about 0.092 Ω/sq.

Example 4. Examination of Exothermic Property

In order to examine the exothermic property of the hybrid film of the present invention, a polyimide film was coated with the hybrid film prepared in Example 2, and then cut to a size of 2 cm×2 cm. Then, copper tapes were attached to both sides of the film, and a (+) electrode and a (−) electrode were connected onto the copper tapes, respectively. Thereafter, voltages of 0.5 V, 1.0 V, and 1.5 V were applied to the film, and an experiment was conducted by measuring the temperature rise for several seconds in real time using an ultraviolet camera to examine the exothermic property of the film, and the results are shown in FIG. 6.

Figure 6:
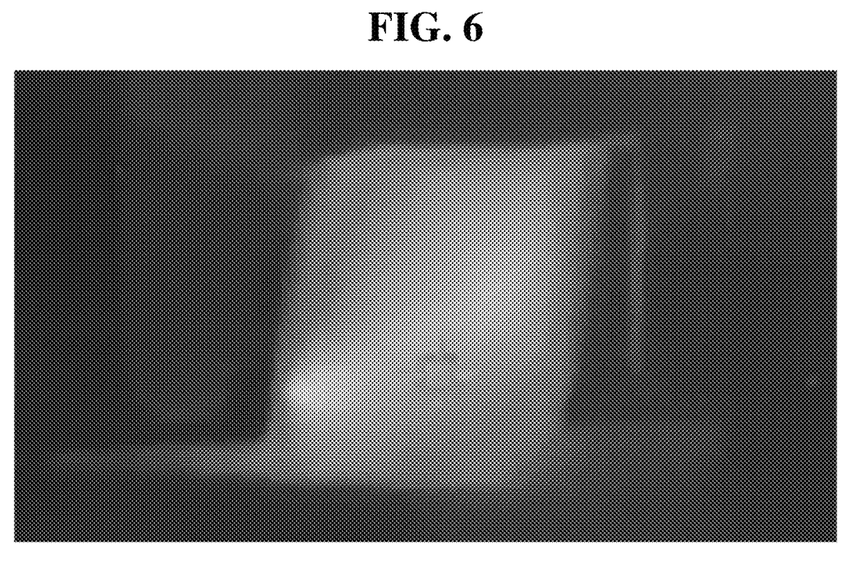
FIG. 6 shows the result of examining the exothermic property of the hybrid film of the present invention.

Referring to FIG. 6, it was confirmed that the temperature of the hybrid film of the present invention increased from 28.5° C. at a voltage of 0.5 V to 47.8° C. at a voltage of 0.5 V, 116° C. at 1.0 V, and 212° C. at 1.5 V, suggesting that the hybrid film of the present invention can provide a heater with very high performance capable of exhibiting a high temperature even at a low voltage.

The above description of the present invention is exemplary, and those skilled in the art will appreciate that the present invention may be embodied in other specific forms without departing from the technical spirit or essential characteristics of the present invention. Therefore, it should be understood that the embodiments described above are exemplary in all aspects and are not restrictive.

The invention claimed is:

1. A polymeric dispersant represented by the following Formula 1, which is capable of hybridizing nano-metal and nano-carbon together:

[Formula 1]

[Formula 1]

wherein l, m or n is an integer ranging from 1 to 500.

2. The polymeric dispersant of claim 1, wherein the polymeric dispersant represented by Formula 1 has a molecular weight of $1 \times 10^4$ to $5 \times 10^4$ g/mol.

3. The polymeric dispersant of claim 1, wherein the metal in the nano-metal is at least one selected from the group consisting of silver (Ag), copper (Cu), gold (Au), chromium (Cr), aluminum (Al), tungsten (W), zinc (Zn), nickel (Ni), iron (Fe), platinum (Pt), and palladium (Pd).

4. The polymeric dispersant of claim 1, wherein the nano-carbon is carbon quantum dots, fullerene, carbon nano-ribbons, carbon nano-tubes, or graphene.

5. A method for preparing a polymeric dispersant, the method comprising steps of:

(A1) synthesizing a monomer represented by the following Formula 2 using lipoic acid, which has a disulfide functional group, and 2-hydroxyethyl methacrylate; and (A2) preparing a polymeric dispersant represented by the following Formula 1 by mixing the monomer represented by the following Formula 2, a 2-(dimethyl-amino) ethyl methacrylate represented by the following Formula 3, and an aromatic monomer having at least one unsaturated group:

[Formula 2]

[Formula 3]

wherein l, m or n is an integer ranging from 1 to 500.

6. The method of claim 5, wherein step (A1) of preparing the monomer represented by Formula 2 comprises steps of:

(A1a) dissolving a mixture of lipoic acid and 2-hydroxyethyl methacrylate in a solvent;

(A1b) adding dicyclohexylcarbodiimide (DCC) to the mixture, followed by stirring for 12 to 36 hours; and (A1c) obtaining the monomer represented by Formula 2 by removing impurities through chromatography after the stirring, wherein the mixture in step (A1a) is cooled to a temperature ranging from −5 to 5° C. after dissolution.

7. The method of claim 5, wherein step (A2) comprises steps of:
- (A2a) preparing a mixture by dissolving, in a solvent, the monomer represented by Formula 2, the 2-(dimethylamino) ethyl methacrylate represented by Formula 3, and the aromatic monomer having at least one unsaturated group;
- (A2b) stirring the mixture at a temperature ranging from 80 to 100° C.; and
- (A2c) preparing the polymeric dispersant represented by Formula 1 by removing impurities by centrifugation, after completion of the stirring.

8. The method of claim 5, wherein the solvent is at least one selected from the group consisting of a lower alcohol having 1 to 4 carbon atoms, anisole, hexane, ethyl acetate (EA), methyl iodide (iodomethane), azo-bisisobutyronitrile, dichloromethane (DCM), dimethylformamide (DMF), dicyclohexylcarbodiimide (DCC), diethyl ether, chloroform, and acetone.

9. The method of claim 5, further comprising step (A3) of quaternizing the polymeric dispersant represented by Formula 1, after step (A2).

10. The method of claim 9, wherein step (A3) comprises steps of:
- (A3a) dissolving the polymeric dispersant represented by Formula 1 in a solvent, followed by stirring for 6 to 36 hours; and
- (A3b) preparing a quaternized polymeric dispersant by removing impurities by centrifugation and drying, after completion of the stirring.

11. A method for manufacturing a hybrid film comprising nano-metal and nano-carbon, the method comprising steps of:
- (B1) dispersing nano-carbon in deionized water to obtain a solution;
- (B2) dissolving a polymeric dispersant represented by the following Formula 1 in the solution, followed by mixing with the nano-carbon to obtain a mixture; and
- (B3) manufacturing a hybrid film by adding a nano-metal solution to the mixture:

[Formula 1]

wherein l, m or n is an integer ranging from 1 to 500.

12. The method of claim 11, wherein the metal in the nano-metal is at least one selected from the group consisting of silver (Ag), copper (Cu), gold (Au), chromium (Cr), aluminum (Al), tungsten (W), zinc (Zn), nickel (Ni), iron (Fe), platinum (Pt), and palladium (Pd).

13. The method of claim 11, wherein the nano-carbon is carbon quantum dots, fullerene, carbon nano-ribbons, carbon nano-tubes, or graphene.

14. The method of claim 11, wherein step (B2) comprises steps of:
- (B2a) sonicating the solution prepared in step (B1); and
- (B2b) adding hydrazine monohydrate to the sonicated solution, followed by stirring for 3 to 10 hours,
wherein the stirring is performed at 50 to 80° C.

15. A hybrid film produced by the production method of claim 11.

* * * * *